United States Patent [19]

Kitani

[11] Patent Number: 4,978,882
[45] Date of Patent: Dec. 18, 1990

[54] VIBRATION WAVE DRIVEN MOTOR

[75] Inventor: Koji Kitani, Kawasaki, Japan

[73] Assignee: Canon Kabushiki Kaisha, Tokyo, Japan

[21] Appl. No.: 514,411

[22] Filed: Apr. 25, 1990

[30] Foreign Application Priority Data

Apr. 25, 1989 [JP] Japan .................................. 1-105508

[51] Int. Cl.$^5$ ............................................. H01L 41/08
[52] U.S. Cl. ..................................... 310/328; 310/323
[58] Field of Search ................................ 310/323, 328

[56] References Cited

U.S. PATENT DOCUMENTS

| | | | |
|---|---|---|---|
| 4,736,129 | 4/1988 | Endo et al. ........................... | 310/323 |
| 4,739,212 | 4/1988 | Imasaka et al. ...................... | 310/323 |

FOREIGN PATENT DOCUMENTS

| | | | |
|---|---|---|---|
| 0023379 | 1/1987 | Japan ................................... | 310/323 |
| 0209865 | 1/1987 | Japan ................................... | 310/323 |
| 0114480 | 5/1987 | Japan ................................... | 310/323 |
| 0114481 | 5/1987 | Japan ................................... | 310/323 |
| 0147979 | 7/1987 | Japan ................................... | 310/323 |

Primary Examiner—Mark O. Budd
Attorney, Agent, or Firm—Fitzpatrick Cella Harper & Scinto

[57] ABSTRACT

In a vibration wave driven motor wherein a vibration member and a member brought into pressure contact with the vibration member is frictionally driven relative to each other through a sliding material secured to the sliding surface of one of them, the sliding material is a compound resin material comprising fluorine resin as a matrix material, and thermosetting resin or thermoplastic resin having a higher melting point than the fluorine resin.

10 Claims, 3 Drawing Sheets

VIBRATION WAVE DRIVEN MOTOR

BACKGROUND OF THE INVENTION

1. Field of the Invention

This invention relates to a vibration wave driven motor in which a vibration member and a member being in pressure contact with the vibration member are moved relative to each other by a travelling vibration wave generated in the vibration member, and more particularly to the material of a sliding member in the pressure contact portion.

2. Related Background Art

The outline of the principle of a vibration wave driven motor utilizing a travelling vibration wave is as will be described below.

Two groups of piezo-electric elements arranged circumferentially on and secured to one surface of a ring-like vibration member of a resilient material whose full circumferential length is integer times a certain length $\lambda$ is defined as a stator. These piezoelectric elements as electro-mechanical energy conversion elements, in each groups, are arranged at a pitch of $\lambda/2$ and so as to be alternately opposite in expansion and contraction polarity, and all arranged so that there may be deviation odd number times as great as $\lambda/4$ between the two groups. The two groups of piezo-electric elements have electrode films applied thereto. If an AC voltage is applied only to one group (hereinafter referred to as the A phase), a standing wave (wavelength $\lambda$) of such fluxural vibration that the midpoint of each piezo-electric element in each group and points at every $\lambda/2$ therefrom are the positioned of loops and the midpoint between said positioned of loops is the position of mode is generated over the full circumference of said vibration member. If an AC voltage is applied only to the other group (hereinafter referred to as the B phase), a standing wave is likewise generated, but the positions of the loops and node deviate by $\lambda/4$ from those of the standing wave by the A phase. If AC voltages identical in frequency to each other and having a time phase difference of 90° therebetween are applied to the A and B phases at a time, the standing waves of the two are combined together with a result that a travelling wave (wavelength $\lambda$) of flexural vibration vibrating circumferentially is generated in the vibration member and at this time, each polygonal point of said vibration member having a thickness effects a kind of elliptical motion. Consequently, if for example, a ring-like moving member as a rotor is brought into pressure contact with each other surface of the vibration member, said moving member receives circumferential friction from the vibration member and is rotatively driven thereby.

Accordingly, it is desirable for taking out the output efficiently that a sliding material of high coefficient of friction be provided in the pressure contact portion between the vibration member and the moving member, and in the prior art, as described, for example, in Japanese Laid-Open Patent Application No. 62-100778, a mixture (WC-Co) of tungsten carbide and cobalt is used as a sliding material on the vibration member side and hard alumite is used as a sliding material on the moving member side.

Now, where such sliding materials are used, abrasion is small if the output of the vibration wave driven motor is 1 W or less, but if the pressure force of the vibration member and the moving member is made great or the number of revolutions is increased to obtain an output of the order of 3–5 W, it has led to a problem that the abrasion of the hard alumite layer which is the sliding material on the moving member side progresses rapidly and at a point of time whereat this layer has disappeared, the reduction in the torque performance of the vibration wave driven motor becomes remarkable and the like of the vibration wave driven motor comes to an end.

When the state of this abrasion has been examined, it has been found that the hard alumite layer has been fragility-destroyed.

Therefore, in order to increase the toughness of the sliding material on the moving member side, nylon 66 (hereinafter referred to an PA 66, the coefficient of friction: 0.8-1.5) which is thermoplastic resin has been used as the sliding material on this side and WC-Co has been used as the sliding material on the vibration member side and the motor has been driven, but the resin simple substance has produced a great deal of abrasion powder and stable rotation has not been achieved with such abrasion powder rolled in the sliding surface.

When the cause of this abrasion has been examined, it has been found that the cause is the shear peeling (adhesion abrasion) due to the adhesion of the two surfaces of resin and WC-Co which are the sliding materials on the two sides. To prevent this adhesion abrasion, it is effective and popular to compound fiber and powder having slidability.

So, when PA 66 (coefficient of friction 0.4–0.6) having 10–30% by weight of high strength type carbon fiber compounded as a filler was used and the motor was driven, abrasion decreased sharply, but there occurred a phenomenon of torque falling sharply during constant speed rotation (hereinafter referred to as the torque down). When the resin sliding surface was observed after the driving, it was found that part of the compounded carbon fiber was lost. Judging from the manner in which carbon fiber was lost and the face that the coefficient of friction of carbon fiber is lower than that of PA66, it can be conjectured that carbon fiber was subjected to vibration and fragility-destroyed and abraded, and the torque down can be presumed to have caused the abraded powder of carbon fiber to be rolled into the sliding surface.

Also, in any of the above-described cases, there occurred sometimes abnormal sounds.

That is, summing up what has been described above, there are the following difficulties:

(1) The lack of toughness of the sliding material causes the sliding material to be fragility-destroyed and abraded;

(2) If the sliding material is a resin simple substance, adhesion abrasion is caused; and (3) If a filler is put into resin to solve the problem mentioned under item (2) above, the adhesion abrasion of resin decreases, but the lack of toughness of the filler itself causes the filler to be fragility-destroyed and abraded under the influence of vibration; and these difficulties have caused irregular torque, torque down and occurrence of abnormal sounds in the performance of the viabration wave driven motor.

SUMMARY OF THE INVENTION

It is an object of the present invention to provide a vibration wave driven motor using a sliding material which can prevent irregular torque, torque down and occurrence of abnormal sounds.

It is another object of the present invention to provide a vibration wave driven motor of high output which is reduced in irregular torque and occurrence of abnormal sounds and is free of torque down.

Further objects of the present invention will become apparent from the following detailed description of the invention.

DESCRIPTION OF THE PREFERRED EMBODIMENT

Figure 1A:
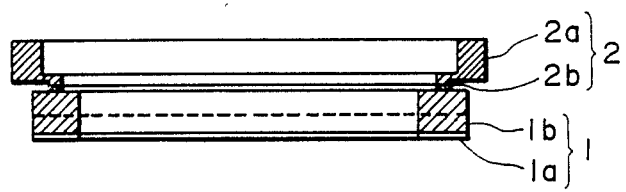
FIGS. 1A and 1B show an embodiment of a vibration wave driven motor according to the present invention, FIG. 1A being a cross-sectional view thereof, and FIG. 1B being a front view thereof.

The present invention will hereinafter be described in detail with respect to an embodiment thereof shown in the drawings.

Figure 1B:
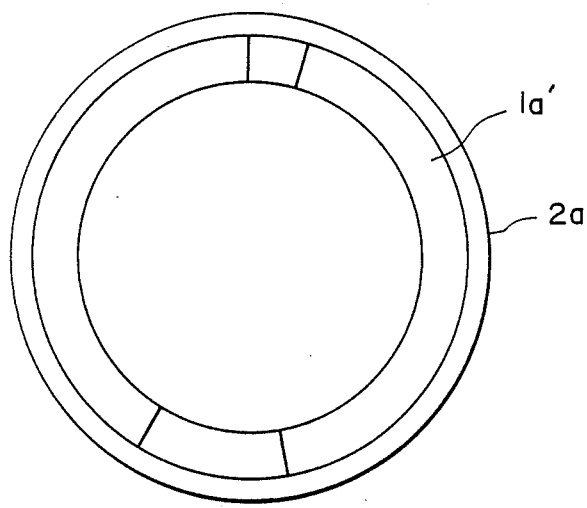

FIG. 1A is a cross-sectional view showing an embodiment of a vibration wave driven motor according to the present invention, and FIG. 1B is a front view thereof.

In FIGS. 1A and 1B, the reference numeral 1 designates a vibration member comprising a ring-like metallic vibration member 1b formed, for example, of stainless steel or phosphor bronze having flexibility, and a group of conventional piezo-electric elements 1a comprising two groups of piezo-electric elements polarized into a plurality as described previously and formed into a ring-like shape, said group of piezoelectric elements 1a being concentrically secured to one side of said metallic vibration member 1b by a heat-resisting epoxy resin adhesive agent. The sliding surface of the vibration member 1 which is opposite to the surface thereof to which the group of piezoelectric elements 1a is adhesively secured is formed with a plurality of comb-teeth like grooves (not shown) at circumferentially equal intervals to make the driving speed great, and is fixed to a case, not shown, near the central portion thereof.

The reference numeral 2 denotes a moving member comprising a ring-like support member 2a formed of a metal such as an aluminum alloy, and a ring-like sliding material 2b concentricallly secured to one side of support member 2a by an epoxy adhesive agent. The surface of the sliding material 2b is endowed with an adhesive property by the etching process or the like to thereby provide a good adhesive property of the sliding material 2b.

The sliding surface of the vibration member 1 and the sliding material 2b of the moving member 2 are arially brought into pressure contact with each other by pressing means, not shown, for example, with a load of 10 dgf.

When an AC voltage equal to the natural frequency of the vibration member 1 is applied to the two groups of piezo-electric elements comprising conventional piezoelectric elements alternately polarized in the direction of thickness, the vibration member 1 causes resonance, and a travelling vibration wave is generated in the circumferential direction of the sliding surface thereof, whereby the moving member 2 which is in pressure contact with the surface of the vibration member 1 is rotatively driven by the frictional force between the vibration member 1 and the sliding surface of the sliding material 2b.

The sliding material 2b used in the present embodiment consists of fluorine resin, for example, polytetrafluoroethylene PTFE as a matrix material, and thermosetting resin or thermoplastic resin having a higher melting point than the fluorine resin, for example, powdered polyimide PI (Particle diameter of 50–100 μm), as a filler, uniformly dispersed in PTFE at a weight ratio of 20%.

The coefficient of friction of the sliding material 2b relative to the sliding surface (WC-Co) of the vibration member 1 is 0.22. The present embodiment and comparative examples will be shown in Table 1 below.

TABLE 1

|  | Resin as matrix material | Filler | Coefficient of friction (relative to WC-Co) |
| --- | --- | --- | --- |
| Comparative Example 1 | PA66 | none | 0.8–1.5 |
| Comparative Example 2 | PA66 | Carbon fiber (15 wt %) | 0.4–0.6 |
| Present Embodiment | PTFE | PI (20 wt %) | 0.22 |

Also, the amount of abrasion after a predetermined time (24 hours), the fluctuation of the torque with time (the rate of the torque varying with the lapse of time) during the driving of the motor, the irregularity of torque, torque down and the presence of abnormal sounds when the thickness of the sliding materials of Comparative Examples 1 and 2 and the sliding material 2b of the present embodiment is 0.3 mm and the pressing force is 6 kgf and the vibration amplitude of the vibration member 1 is constant and the motor is driven at the number of revolutions 100 rpm will be comparatively shown in Table 2 below.

TABLE 2

|  | Abrasion | Torque gfcm | Fluctuation of torque with time | Irregularity of torque | Torque down | Abnormal sounds |
| --- | --- | --- | --- | --- | --- | --- |
| Comparative Example 1 | great | — | great | — | — | present |
| Comparative Example 2 | small | 1700 | medium | 250 gfcm | present | sometimes present |
| Present Embodiment | small | 1500 | small | 100 gfcm | absent | absent |

In the case of the sliding material of Comparative Example 1 comprising PA66 simple substance, the fluctuation of the torque was very great and the evaluation of the torque, the irregularity of torque and torque down was impossible. Also, the production of abrasion powder was found even during the driving, and traces of pluck-off were found on the frictional surface of the sliding material after the driving.

Figure 2A:
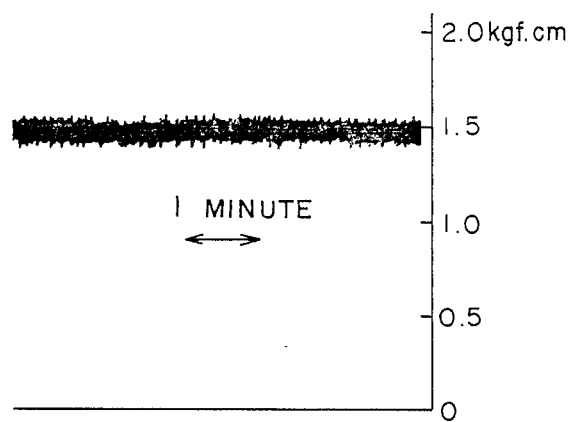
FIG. 2A shows a torque chart when use is made of a sliding material consisting of 80% by weight of PTFE and 20% by weight of PI.
Figure 2B:
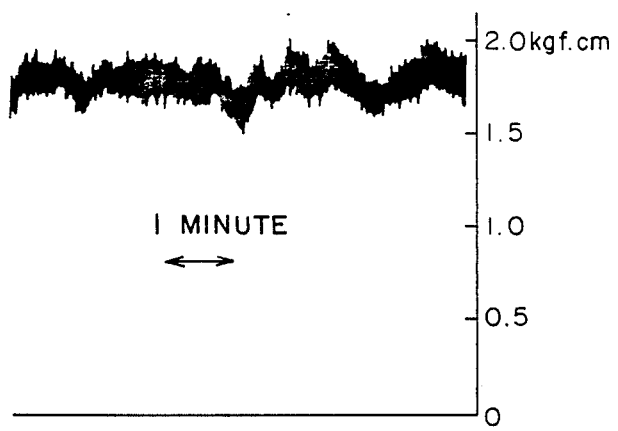
FIG. 2B shows a torque chart when use is made of a sliding material consisting of 85% by weight of PA66 and 15% by weight of carbon fiber.

In the case of the sliding material of Comparative Example 2 comprising a compound of PA66 and carbon fiber, the irregularity of torque as seen in FIG. 2B was great and torque down was also found. A loss was found in the carbon fiber on the frictional surface of the sliding material after the driving.

In the case of the sliding material 2b of the present embodiment comprising a compound of PTFE and PI, as seen in FIG. 2A, there was no irregularity of torque and no fluctuation of the torque with time, and the abnormal sounds, produced in Comparative Examples 1 and 2, were not at all produced, and after the driving, the shift of PTFE to the vibration member side was observed, and it was found that sliding movement through the PTFE took place.

Also, a reduction in the performance was presupposed from the low coefficient of friction, but the maximum efficiency of the motor exceeded 30% and there was no problem in practical use.

Figure 3:
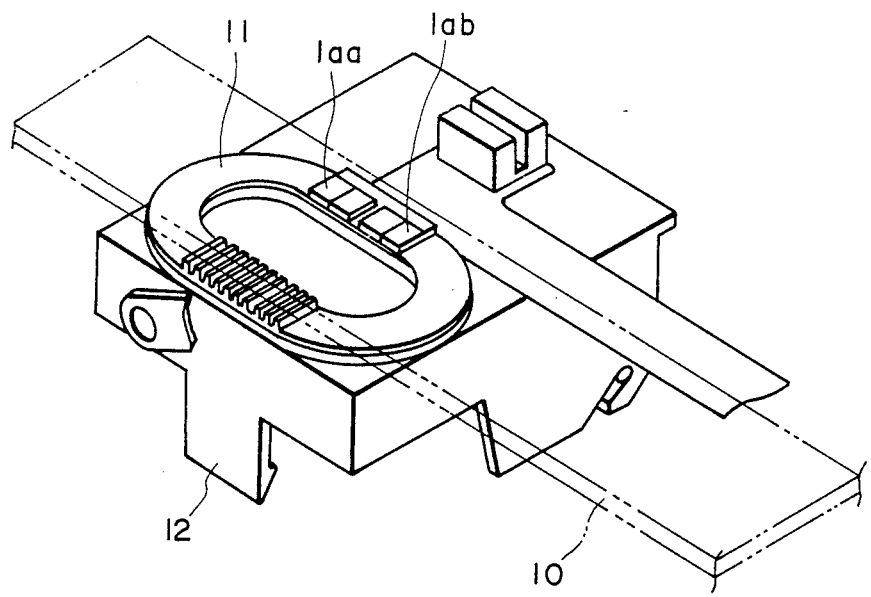
FIG. 3 is a perspective view showing the essential portions of a printer to which the present invention is applied.

In the above-described embodiment, the vibration member is fixed and the moving member is moved in response to a travelling vibration wave, but for example, a vibration member 11 (FIG. 3) as a moving member may be brought into pressure contact with a support member 10 (FIG. 3) on a flat plate forming a part of a printer so that the vibration member 11 itself may be moved by a travelling vibration wave generated on the vibration member 11, or conversely, the sliding material may be provided on the vibration member side. In FIG. 3, the reference characters 1aa and 1ab designate piezoelectric elements as electromechanical energy conversion elements divided into two groups, and the reference numeral 12 denotes a carriage.

As the aforementioned fluorine resin, use can be made of, besides the aforementioned PTFE, tetrafluoroethylene-hexafluoropropylene (FEP), tetrafluoroethylene-hexafluoropropylene-perfluoroalkyl vinyl ether (EPE) or tetrafluoroethylene-perfluoroalkyl vinyl ether (PFA). Further, as the filler, mention may be made, in addition to the aforementioned PI, of thermoplastic polyimide, polyetherimide, polyamideimide, polyether ether ketone, polyether ketone, polyether ketone ketone, polyether sulphone, aromatic polyamide, polyphenylene sulfide, and polyethylene terephthalate.

Also, the toughness of the abovementioned fillers is higher than that of carbon fiber which is the heretofore used filler or alumina which is the sliding material, and comparing them in terms of dilation, for example, the dilation of carbon fiber or alumina is of the order of 1%, whereas for example, the dilation of PI is of the order of 6-10%.

The proportion of the filler comprising thermosetting resin or thermoplastic resin to fluorine in the range of 10–40 weight % because there is a limit in the addition of the filler to fluorine resin and for the purpose of minimizing the layer-like peeling-off of the matrix material, improving the abrasion characteristic of the sliding member, giving the matrix material an anti-creep property and improving the starting characteristic after the sliding material is left for a long period of time as it is.

The filler can be charged in the form of fiber or powder into the matrix material.

If the proportion of the filler is 10% or less, no remarkable effect can be obtained, and if the proportion of the filler exceeds 40%, the surface peeling-off property of the sliding material will become smaller and smaller and the shift thereof to the partner material will become less, thus aggravating the friction characteristic and the abrasion characteristic.

Further, the sliding material is a compound material using resin alone and therefore, no abrasion will occur even if the surface of the resilient material forming the partner member with which the sliding material is brought into pressure contact, for example, the vibration member, is intactly used as the sliding surface.

While the above-described embodiment is a motor in which relative movement is caused by a travelling wave, the present invention is also applicable to a motor as disclosed in FIG. 2 of Japanese Laid-Open Patent Application No. 59-122385 wherein a relative movement force is generated not by a vibration wave, but by periodic vibration.

As has hitherto been described, according to the present invention, one sliding material forming the frictional driving surface in the vibration wave driven motor is a compound resin material comprising fluorine resin as the matrix material and filled with thermoplastic resin or thermosetting resin, whereby there can be provided a vibration wave driven motor which is very stable in frictional force and output performance and which has a high output, e.g. 3–5 W.

Further, there is provided a vibration wave driven motor in which the abrasion of the sliding material is small because the sliding material is compound resin and which is good in durability.

I claim:

1. A vibration wave driven motor in which a vibration member and a member brought into pressure contact with said vibration member are frictionally driven relative to each other through a sliding material secured to the sliding surface of one of them, characterized in that said sliding material is a compound resin material comprising fluorine resin as a matrix material, and thermosetting resin or thermoplastic resin having a higher melting point than said fluorine resin.

2. A vibration wave driven motor according to claim 1, characterized in that 10–40% by weight of thermosetting resin or thermoplastic resin is added to said fluorine resin.

3. A vibration motor in which a vibration member and a member brought into pressure contact with said vibration member are frictionally driven relative to each other through a sliding material secured to the sliding surface of one of them, characterized in that said sliding material is a compound resin material comprising fluorine resin as a matrix material, and thermosetting resin or thermoplastic resin having a higher melting point than said fluorine resin.

4. A vibration motor according to claim 3, characterized in that 10–40% by weight of thermosetting resin or thermoplastic resin is added to said fluorine resin.

5. A vibration driven device for a printer comprising:
(a) a vibration member having a friction surface and for generating a periodic vibration in response to an applied electrical signal;
(b) a friction member for receiving the periodic vibration, said friction member being in contact with the friction surface of said vibration member; and (c) a sliding material provided on one of said friction surface and said friction member, said sliding material being a compound resin material comprising fluorine resin as a matrix material, and thermosetting resin or thermoplastic resin having a higher melting point than said fluorine resin.

6. A vibration driven device according to claim 5, characterized in that 10–40% by weight of thermosetting resin or thermoplastic resin is added to said fluorine resin.

7. A vibration driven device according to claim 5, wherein said friction member is a flat plate forming a part of the printer.

8. A vibration driven device for a system comprising:
(a) a vibration member having a friction surface and for generating a periodic vibration in response to an applied electrical signal;
(b) a friction member for receiving the periodic vibration, said friction member being in contact with the friction surface of said vibration member; and
(c) a sliding material provided on one of said friction surface and said friction member, said sliding material being a compound resin material comprising fluorine resin as a matrix material and thermosetting resin or thermoplastic resin having a higher melting point than said fluorine resin.

9. A vibration driven device according to claim 8, characterized in that 10–40% by weight of thermosetting resin or thermoplastic resin is added to said fluorine resin.

10. A vibration driven device according to claim 8, wherein said friction member is a flat plate forming a part of the system.

* * * * *